United States Patent Office 3,410,842
Patented Nov. 12, 1968

3,410,842
DITHIOCARBAMIC COMPOUNDS AND PROCESS FOR THEIR PREPARATION
André Allais, Les Lilas, and Pierre Girault, Paris, France, assignors to Roussel—UCLAF, Paris, France, a corporation of France
No Drawing. Filed Dec. 14, 1965, Ser. No. 513,859
Claims priority, application France, Dec. 22, 1964, 999,589; Oct. 1, 1965, 33,455
17 Claims. (Cl. 260—239.3)

ABSTRACT OF THE DISCLOSURE

This disclosure relates to N-(N',N'-substituted dithiocarbamyl)-imides of the general Formula I:

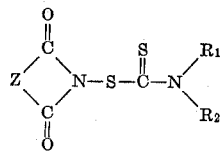

wherein $R_1$ and $R_2$ represent lower alkyl, lower alkenyl, aralkyl or an aryl or wherein the group

forms a nitrogen heterocycle, which can have another hetero element; Z represents an organic divalent radical, more particularly an organic divalent aliphatic radical of the type $—(CH_2)_n—$, $n$ being equal to 1, 2, 3 or 4, an alicyclic divalent radical of the type

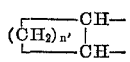

$n'$ being equal to 2, 3, 4, 5 or 6, an alicyclic divalent radical of the type of dicyclo-[2,2,1]-heptane or heptene, an aromatic divalent radical of the ortho type

or a heterocyclic divalent radical of the ortho type; these divalent radicals can have one or several substituents, chosen in particular from the group comprising the lower alkyls, the alkoxyls, the halogens and the nitro group.

---

The novel compounds of the general Formula I display remarkable anti-fungal properties, allowing these compounds to be utilizable in agriculture to combat fungi parasiting cultures. Of these compounds, N-(N',N'-dimethyldithiocarbamyl)-succinimide, Compound II, N-(N',N'-dimethyldithiocarbamyl)-phthalimide, Compound III, N-(N',N'-dimethyldithiocarbamyl)-hexahydrophthalimide, Compound IV, and N-(N',N'-dimethyl-dithiocarbamyl)-4-nitrophthalimide, Compound V, are of particular interest.

An object of the present invention is the obtention of an N-(N',N'-substituted-dithiocarbamyl)-imide of the formula

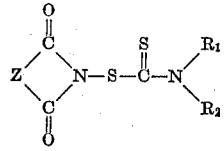

wherein Z is a bivalent organic radical selected from the group consisting of

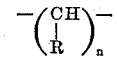

wherein R represents a member selected from the group consisting of hydrogen, lower alkyl, lower alkoxy, nitro and halogen and $n$ is an integer from 1 to 4,

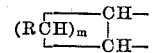

wherein R has the above-assigned values and $m$ is an integer from 2 to 6,

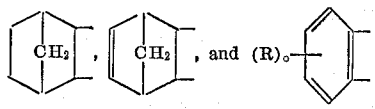

wherein R has the above-assigned values and $o$ is an integer from 1 to 4; and $R_1$ and $R_2$ are members selected from the group consisting of lower alkyl, lower alkenyl, aralkyl, aryl and together with the nitrogen, morpholinyl, piperidinyl, pipecolinyl, pyrrolidinyl and ethyleniminyl.

Another object of the present invention is the development of a process for the production of an N-(N',N'-substituted-dithiocarbamyl)-imide of the formula

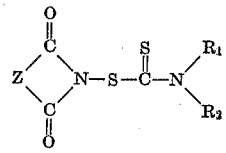

wherein Z is a bivalent organic radical selected from the group consisting of

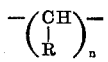

wherein R represents a member selected from the group consisting of hydrogen, lower alkyl, lower alkoxy, nitro, and halogen and $n$ is an integer from 1 to 4,

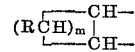

wherein R has the above-assigned values and $m$ is an integer from 2 to 6,

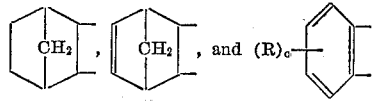

wherein R has the above-assigned values and $o$ is an integer from 1 to 4; and $R_1$ and $R_2$ are members selected from the group consisting of lower alkyl, lower alkenyl, aralkyl, aryl and together with the nitrogen, morpholinyl, piperidinyl, pipecolinyl, pyrrolidinyl and ethyleniminyl, which comprises the steps of reacting a dithiocarbamic acid salt of the formula

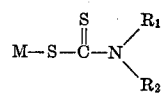

wherein M represents an alkali metal and $R_1$ and $R_2$ have the above-assigned values, in an organic solvent, with an N-haloimide of the formula

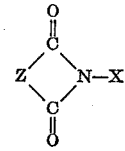

wherein X represents a halogen selected from the group consisting of chlorine and bromine and Z has the above-assigned values, and recovering said N-(N',N'-substituted-dithiocarbamyl)-imide.

A further object of the present invention is the obtention of an antifungal composition comprising an effective amount of an N - (N',N' - substituted - dithiocarbamyl)-imide of the formula

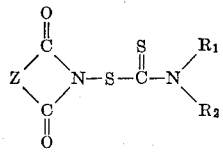

wherein Z is a bivalent organic radical selected from the group consisting of

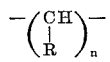

wherein R represents a member selected from the group consisting of hydrogen, lower alkyl, lower alkoxy, nitro and halogen and $n$ is an integer from 1 to 4,

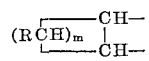

wherein R has the above-assigned values and $m$ is an integer from 2 to 6,

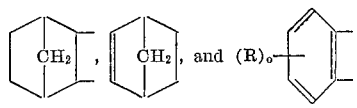

wherein R has the above-assigned values and $o$ is an integer from 1 to 4; and $R_1$ and $R_2$ are members selected from the group consisting of lower alkyl, lower alkenyl, aralkyl, aryl and together with the nitrogen, morpholinyl, piperidinyl, pipecolinyl, pyrrolidinyl and ethyleniminyl; and an inert vehicle.

A still further object of the present invention is the development of a process of combating fungal infestaations of plants which comprises applying to said plants a nonphytotoxic but effective amount of N-(N',N'-substituted-dithiocarbamyl)-imide of the formula

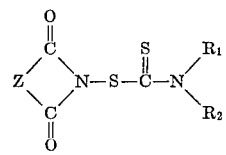

wherein Z is a bivalent organic radical selected from the group consisting of

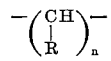

wherein R represents a member selected from the group consisting of hydrogen, lower alkyl, lower alkoxy, nitro and halogen and $n$ is an integer from 1 to 4,

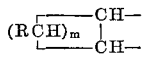

wherein R has the above-assigned values and $m$ is an integer from 2 to 6,

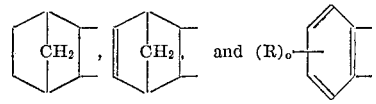

wherein R has the above-assigned values and $o$ is an integer from 1 to 4; and $R_1$ and $R_2$ are members selected from the group consisting of lower alkyl, lower alkenyl, aralkyl, aryl and together with the nitrogen, morpholinyl, piperidinyl, pipecolinyl, pyrrolidinyl and ethyleniminyl.

These and other objects of the present invention will become more apparent as the description thereof proceeds.

The sulfenamide group of the type:

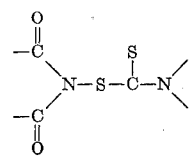

originating from the combination of an amide group and a dithiocarbamyl group is characteristic of the compound I. The study of properties of such group has not been attempted until now within the framework of research concerning new anti-fungal compounds.

Anti-fungal compounds are already known having a remote relationship to the compounds of the general Formula I. These compounds are represented, for example, by zinc ethylene-bis-dithiocarbamate (Zinebe) and by manganese ethylene-bis-dithiocarbamate (Manebe).

However, and therein lies one of the positive advantages of the present invention, the compounds of Formula I do not possess any metal atoms in their molecule. Therefore, on the occasion of their utilization, the compounds will not give rise by degradation to an accumulation of metal atoms, the noxious effect of which is not negligible in the long run for the treated plant, for the cultivated soil and also for humans and animals. Moreover, the compounds of the invention are devoid of any noxious effect on vegetation.

The process for the preparation of the compounds of the general Formula I, a further object of the invention, is characterized in that an alkali metal salt of an N-disubstituted dithiocarbamic acid of the general formula

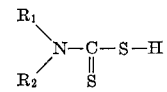

wherein $R_1$ and $R_2$ have the above-assigned meanings, is reacted, in solution in an organic solvent, with an N-haloimide of the general formula

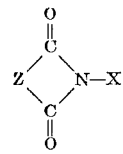

wherein X represents a chlorine or a bromine atom and Z has the above-assigned meanings, and the desired corresponding N - (N',N' - substituted - dithiocarbamyl)-imide is isolated.

For utilization in the field, the compounds of the general Formula I may be employed in the form of a wettable powder, containing dispersing agents. The wettable powders are placed in suspension in water at any desired moment and are distributed by means of conventional devices utilized in agricultural operations. The compounds of the invention may also be dispersed as a dust, the compounds being diluted in an inert powder, showing a favorable distribution.

Among the compounds of interest in the N-(N',N'-substituted-dithiocarbamyl)-imides of the invention of the formula

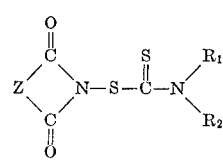

are those wherein Z is a bivalent organic radical such as:

(a) 

wherein R represents hydrogen, lower alkyl, lower alkoxy, nitro and halogen and $n$ is an integer from 1 to 4; for example:

ethylene (R=H, $n$=2)
dichloroethylene (R=Cl, $n$=2)
1,2-propylene (R=Cl, $n$=2)
1,3-propylene (R=H, $n$=3)
1,4-butylene (R=H, $n$=4), etc.;

(b)

wherein R has the above-assigned values and $m$ is an integer of from 2 to 6, for example:

1,2-hexahydrophenylene (R=H, $m$=4)
4-chloro-1,2-hexahydrophenylene (R=Cl, $m$=4)
4 - methoxy - 1,2 - hexahydrophenylene (R=OCH$_3$, $m$=4), etc.;

(c)

for example, 3,6-endomethylene-1,2-hexahydrophenylene;

(d)

for example, 3,6-endomethylene-1,2-hexahydrophenylene; and (e)

wherein R has the above-assigned values and $o$ is an integer from 1 to 4, for example:

1,2-phenylene
4-chloro-1,2-phenylene (R=Cl, $o$=1)
4-nitro-1,2-phenylene (R=NO$_2$, $o$=1)
4-methyl-1,2-phenylene (R=CH$_3$, $o$=1), etc.;

and wherein R$_1$ and R$_2$ are (f) lower alkyl, for example, methyl, ethyl, etc.;
(g) lower alkenyl, for example, allyl, etc.;
(h) aralkyl, particularly phenyl-lower-alkyl, for example, benzyl, phenethyl, p-methyl-benzyl, etc.;
(i) aryl, particularly phenyl, for example, phenyl, p-methylphenyl, etc.; and
(j) when taken together with the nitrogen, morpholinyl, piperidinyl, pipecolinyl, pyrrolidinyl and ethyleniminyl.

The following examples will serve for better comprehension of the invention, but without limiting its characteristics.

EXAMPLE I

Preparation of N-(N',N'-dimethyl-dithiocarbamyl)-succinimide, Compound II (I, Z=—CH$_2$—CH$_2$—, R$_1$=R$_2$=CH$_3$)

Under agitation, 78 gm. of sodium N,N-dimethyldithiocarbamate were introduced into 1 liter of acetone. Then, in small fractions within the space of 10 minutes, 97.5 gm. of N-bromosuccinimide were added thereto. The agitation was continued for 2 hours at a temperature of about 20° C.

The reaction mixture was vacuum filtered, washed with acetone and the filtrate was evaporated to dryness under vacuum. The residual oil was taken up in ethanol. Crystallization was started by allowing the ethanol-oil mixture to stand for 1 hour at room temperature and was completed in an ice bath.

The crystals formed were vacuum filtered, washed with iced ethanol and dried under vacuum to obtain 59 gm. of N - (N',N' - dimethyl - dithiocarbamyl) - succinimide (I, Z=—CH$_2$—CH$_2$—, R$_1$=R$_2$=CH$_3$), hereinafter called Compound II. The product obtained had a melting point of 166 to 167° C. after recrystallization, first from three volumes of acetone and then from five volumes of methanol.

The product occurred in the form of colorless prisms, insoluble in water, slightly soluble in alcohol, acetone, methanol and ether, soluble in chloroform and benzene.

Analysis.—C$_7$H$_{10}$N$_2$O$_2$S$_2$; molecular weight=218.3. Calculated: C, 38.51%; H, 4.62%; N, 12.83%; S, 29.38%. Found: C, 38.5%; H, 4.6%; N, 12.5%; S, 29.2%.

EXAMPLE II

Preparation of N-(N',N'-dimethyl-dithiocarbamyl)-phthalimide, Compound III (I, Z = 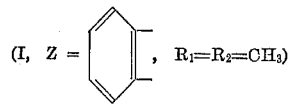, R$_1$=R$_2$=CH$_3$)

Under agitation, 63 gm. of sodium N,N-dimethyl-dithiocarbamate were introduced into 1 liter of acetone; next, within the space of 40 minutes and at a temperature of 20 to 25° C., a solution of 91 gm. of bromophthalimide in 1.5 liters of acetone was added. The agitation was maintained for 2 hours.

The reaction was vacuum filtered, washed with acetone and then the filtrate was evaporated to dryness under vacuum. The residue was taken up in water, vacuum filtered, washed with water and dried. The product obtained was placed in suspension in 200 cc. of a N sodium hydroxide solution. The product was vacuum filtered, washed with water and dried under vacuum to obtain 51 gm. of N-(N',N'-dimethyl-dithiocarbamyl)-phthalimide (I, Z = 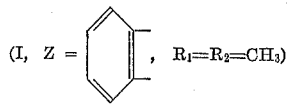, R$_1$=R$_2$=CH$_3$)

hereinafter called Compound III, which had a melting point of 230 to 231° C. after crystallization from 16 volumes of tetrahydrofuran and 16 volumes of methylethylketone.

The product appeared in the form of colorless prisms, insoluble in water and ether, slightly soluble in alcohol, acetone, benzene and chloroform.

Analysis.—C$_{11}$H$_{10}$N$_2$O$_2$S$_2$; molecular weight=266.35. Calculated: C, 49.6%; H, 3.78%; S, 24.08%; N, 10.52%. Found: C, 49.6%; H, 3.8%; S, 24.0%; N, 10.5%.

EXAMPLE III

Preparation of N-(N',N'-diethyleneoxy-dithiocarbamyl)-pthalimide

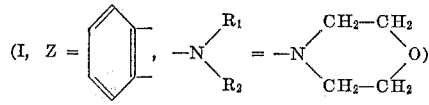

Under agitation and at room temperature, 40 gm. of sodium 1-morpholine carbodithioate (this compound may be prepared according to the process described in the U.S. Patent No. 2,554,182), were dissolved in 1 liter of acetone. Next, within the space of 1 hour, a solution of 45 gm. of N-bromopthalimide in 750 cc. of acetone was added thereto and the agitation was continued for 2 hours.

Thereafter, the reaction mixture was vacuum filtered, washed with acetone and the filtrate was concentrated under vacuum to a volume of about 100 cc. The concentrated filtrate was iced and vacuum filtered. The product was washed first with water, then with a N sodium hydroxide solution and again with water and dried to obtain 25 gm. of N-(N',N'-diethyleneoxy-dithiocarbamyl)-phthalimide

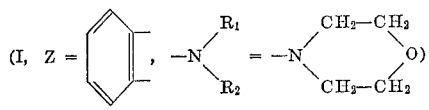

having a melting point of 211 to 212° C.

The product occurred in the form of colorless needles, insoluble in water and ether, slightly soluble in acetone, alcohol, benzene, chloroform, methylethylketone, ethyl acetate and tetrahydrofuran.

*Analysis.*—$C_{13}H_{12}N_2O_3S_2$; molecular weight=308.4. Calculated: C, 50.62%; H, 3.92%; N, 9.08%; S, 20.8%. Found: C, 50.7%; H, 4%; N, 8.9%; S, 20.9%.

EXAMPLE IV

Preparation of N-(N',N'-dimethyl-dithiocarbamyl)-hexahydrophthalimide, Compound IV

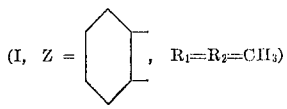

Under agitation, 36 gm. of sodium N,N-dimethyldithiocarbamate were introduced into 1.5 liter of acetone. Then very slowly, at room temperature, a solution of 52 gm. of N-bromohexahydrophthalimide in 500 cc. of acetone was added thereto. The agitation was maintained for 2 hours. The precipitate formed was vacuum filtered and washed with acetone. The filtrate was combined with the acetonic wash liquors and concentrated to a small volume by distillation under vacuum. The concentrated filtrate was iced for 1 hour and vacuum filtered. The product was successively washed with water, then with an N sodium hydroxide solution and again with water and dried. In this manner, N-(N',N'-dimethyl-dithiocarbamyl)-hexahydrophthalimide

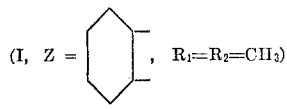

hereinafter called Compound IV, was obtained, which, after recrystallization from methylethylketone and ethyl acetate, had a melting point of 189 to 190° C.

The product occurred in the form of colorless needles, insoluble in water and ether, slightly soluble in alcohol, ethyl acetate and methylethylketone, and soluble in acetone, benzene and chloroform.

*Analysis.*—$C_{11}H_{16}N_2O_2S_2$; molecular weight=272.4. Calculated: C, 48.5%; H, 5.92%; S, 23.54%. Found: C, 48.7%; H, 6.0%; S, 23.2%.

N-bromohexahydrophthalimide was prepared in the following manner:

17.6 gm. of sodium hydroxide pellets were dissolved in 400 cc. of water and the solution was cooled to a temperature of 0° C. Next, 54 gm. of hexahydrophthalimide, having been obtained according to the process described by A. Dunet, Bull. Soc. Chim. (1956), 906, were added to the solution. Then, within the space of 5 minutes, a solution of 58 gm. of bromine in 300 cc. of ether, previously cooled to —10° C., was added, and after the addition was completed, the reaction mixture was agitated for 10 minutes.

The precipitate formed was vacuum filtered, washed with water and dried under vacuum to obtain 52 gm. of N-bromohexahydrophthalimide having a melting point of 103 to 104° C.

The product occurred in the form of colorless prisms, insoluble in water, slightly soluble in alcohol and ether and soluble in acetone.

EXAMPLE V

Preparation of N-(N',N'-dimethyl-dithiocarbamyl)-4-nitrophthalimide, Compound V

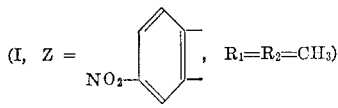

Under agitation, 45 gm. of sodium N,N-dimethyldithiocarbamate were introduced into 2 liters of acetone. Then, over a period of 1 hour at room temperature, a solution of 75 gm. of 4-nitro-N-bromophthalimide in 1 liter of acetone was added. The agitation was continued for 2 hours after the addition was completed. Thereafter, the precipitate formed was vacuum filtered and washed with acetone. The filtrate and the acetonic wash liquors were combined and concentrated to a small volume by distillation under vacuum.

The concentrated filtrate was iced for 1 hour and vacuum filtered. The product was washed with iced acetone and dried to obtain N-(N',N'-dimethyl-dithiocarbamyl)-4-nitrophthalimide

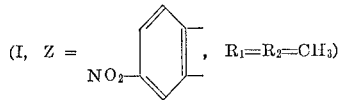

hereinafter called Compound V. This product had, after recrystallization from dimethylformamide, a melting point of 222 to 224° C.

The product occurred in the form of prisms, insoluble in water, very slightly soluble in alcohol, ether, acetone, benzene and chloroform.

*Analysis.*—$C_{11}H_9N_3O_4S_2$: molecular weight=311.3. Calculated: C, 42.4%; H, 2.91%; N, 13.49%; S, 20.6%. Found: C, 42.1%; H, 3.0%; N, 13.0%; S, 20.6%.

4-nitro-N-bromophthalimide may be prepared in the following manner:

20 gm. of sodium hydroxide pellets were dissolved in 800 cc. of water, and the solution was cooled to a temperature of 0° C. Next, 78 gm. of 4-nitrophthalimide, obtainable according to the method described in "Organic Synthesis," vol. 16, p. 58, were added to the solution. Then, within the space of 5 minutes, a solution of 64 gm. of bromine in 400 cc. of ether, previously cooled to —10° C., was added. After the addition was completed, the reaction mixture was agitated for ¼ hour.

The precipitate formed was vacuum filtered, washed with ice water, taken up in boiling acetic acid and rapidly cooled. The mixture was iced and vacuum filtered. The precipitate was washed with petroleum ether (fraction boiling at 60° to 80° C.) and dried under vacuum. 80 gm. of 4-nitro-N-bromophthalimide were obtained, having a melting point of 206 to 208° C.

The product was insoluble in water, very slightly soluble in ether, benzene and chloroform, and soluble in acetone.

EXAMPLE VI

Preparation of N-(N',N'-tetramethylene-dithiocarbamyl)-4-nitrophthalimide

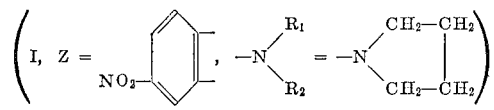

Under agitation, 78 gm. of sodium N,N-tetramethylene-dithiocarbamate were introduced into 3.6 liters of acetone. Then, within the space of 1 hour at room temperature, a solution of 115 gm. of 4-nitro-N-bromophthalimide in 1.6 liters of acetone was added. After the addition was completed, the agitation was maintained for 2 hours.

Thereafter, the precipitate formed was vacuum filtered and washed with acetone. The filtrate was combined with the acetonic wash liquors and concentrated to a small volume by distillation under vacuum.

The concentrated filtrate was iced for 1 hour, vacuum filtered and dried to obtain N-(N',N'-tetramethylene-dithiocarbamyl)-4-nitrophthalimide

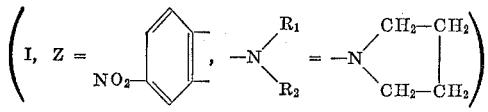

which, after recrystallization from methylethylketone, had a melting point of 208 to 209° C.

The product appeared in the form of needles, insoluble in water and ether, very slightly soluble in alcohol and acetone, slightly soluble in benzene, and soluble in chloroform.

*Analysis.*—$C_{13}H_{11}N_3O_4S_2$: molecular weight=337.4. Calculated: C, 46.27%; H, 3.28%; N, 12.45%; S, 19.01%. Found: C, 46.4%; H, 3.5%; N, 12.5%; S, 19.1%.

Sodium N,N-tetramethylene-dithiocarbamate may be prepared according to the process described in German Patent No. 852,587.

EXAMPLE VII

Preparation of N-(N',N'-diethyl-dithiocarbamyl)-phthalimide

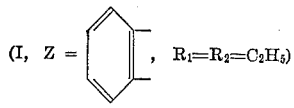

Under agitation, 35 gm. of sodium N,N-diethyldithiocarbamate were introduced into 1 liter of acetone. Next, within the space of 1 hour and at room temperature, a solution of 45 gm. of N-bromophthalimide in 750 cc. of acetone was added thereto. After the addition was completed, the agitation was maintained for 2 hours.

Thereafter, the precipitate formed was vacuum filtered and washed with acetone. The filtrate was combined with the acetonic wash liquors and concentrated to a small volume (about 50 cc.) by distillation under vacuum.

The concentrated filtrate was iced for 1 hour and then vacuum filtered. The precipitate was washed successively with water, with N sodium hydroxide solution and again with water and dried to obtain N-(N',N'-diethyldithiocarbamyl)-phthalimide

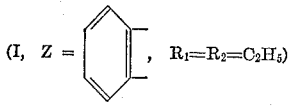

which, after recrystallization from ethanol and methylethylketone, had a melting point of 157 to 158° C.

The product obtained was insoluble in water and ether, slightly soluble in ethanol and methylethylketone, and soluble in benzene and chloroform.

*Analysis.*—$C_{13}H_{14}N_2O_2S_2$: molecular weight=294.4. Calculated: C, 53.03%; H, 4.79%; N, 9.51%; S, 21.78%. Found: C, 53.2%; H, 4.8%; N, 9.1%; S, 21.9%.

EXAMPLE VIII

Preparation of N-(N',N'-dimethyl-dithiocarbamyl)-4-chlorophthalimide

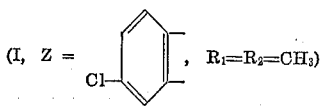

Under agitation, 50 gm. of sodium N,N-dimethyldithiocarbamate were introduced into 1 liter of acetone, cooled to 5° C. Next, within 30 minutes, a suspension of 87 gm. of 4-chloro-N-bromophthalimide in 1 liter of acetone was added thereto. The agitation was maintained for 2 hours at room temperature after the addition was completed.

Thereafter, the precipitate formed was vacuum filtered, washed first with acetone, then with water, then with N sodium hydroxide solution and again with water, and dried to obtain N-(N',N'-dimethyl-dithiocarbamyl)-4-chlorophthalimide

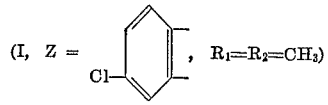

which, after recrystallization from methylethylketone and tetrahydrofuran, had a melting point of 245 to 247° C.

The product obtained occurred in the form of prisms, insoluble in water, very slightly soluble in alcohol, ether, acetone and benzene, and soluble in chloroform.

*Analysis.*—$C_{11}H_9ClN_2O_2S_2$: molecular weight=300.8. Calculated: C, 43.91%; H, 3.01%; Cl, 11.78%; N, 9.33%; S, 21.32%. Found: C, 44.0%; H, 3.0%; Cl, 12.0%; N, 9.4%; S, 21.6%.

4-chloro-N-bromophthalimide was prepared in the following manner:

Under agitation, 8.3 gm. of sodium hydroxide pellets were dissolved in 400 cc. of water, the solution was then cooled to a temperature of 0° C. and then 31 gm. of 4-chlorophthalimide were added. This latter compound could be obtained according to the process described by Levy [J. Chem. Soc. 1931, 79]. Next, a solution of 9 cc. of bromine in 250 cc. of ether, previously cooled, was added, and the reaction mixture was agitated for 10 minutes at about 0° C.

The precipitate formed was vacuum filtered, washed with water and taken up in boiling acetic acid. The solution obtained was rapidly cooled. The precipitate was vacuum filtered, washed with petroleum ether and dried under vacuum to obtain 32 gm. of 4-chloro-N-bromophthalimide, having a melting point of 205 to 206° C.

The product obtained occurred in the form of needles, insoluble in water and dilute aqueous alkalis, very slightly soluble in alcohol, ether and benzene, and slightly soluble in chloroform.

EXAMPLE IX

Preparation of N-(N',N'-tetramethylene-dithiocarbamyl)-4-chlorophthalimide

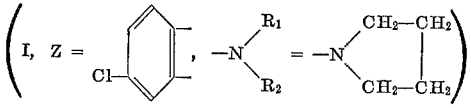

Under agitation, 57 gm. of sodium N,N-tetramethylene-dithiocarbamate were introduced into 1.5 liters of acetone, cooled to 10° C. Within the space of 1 hour and at the temperature of 10° C., a suspension of 90 gm. of 4-chloro-N-bromophthalimide in 3 liters of acetone was added thereto and after this addition had been completed, the agitation was maintained for 3 hours.

The precipitate formed was vacuum filtered and washed with acetone. The filtrate was combined with the acetonic wash waters, concentrated to a small volume by distillation under vacuum, iced for 1 hour and then filtered. The filter cake was washed successively with water, with N sodium hydroxide solution and again with water, then dried. In this manner N-(N',N'-tetramethylene-dithiocarbamyl)-4-chlorophthalimide

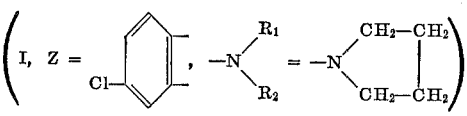

was obtained, having a melting point of 203 to 204° C. after recrystallization from methylethylketone and tetrahydrofuran.

The product occurred in the form of prisms, insoluble in water, very slightly soluble in ether and slightly soluble in acetone, benzene and chloroform.

*Analysis.*—$C_{13}H_{11}ClN_2O_2S_2$: molecular weight=326.8. Calculated: C, 47.77%; H, 3.39%; Cl, 10.85%; N, 8.57%; S, 19.63%. Found: C, 47.6%; H, 3.5%; Cl, 11.1%; N, 8.4%; S, 19.8%.

EXAMPLE X

Preparation of N-(N′,N′-dimethyl-dithiocarbamyl)-glutarimide (I, Z=—$CH_2$—$CH_2$—$CH_2$—, $R_1$=$R_2$=$CH_3$)

Under agitation, 22.5 gm. of sodium N,N-dimethyl-dithiocarbamate were added to 50 cc. of dimethylformamide, cooled to —5° C. and within the space of 20 minutes a solution of 30 gm. of N-bromoglutarimide [described by Gaudry et al., Can. J. Chem., 33, 1724 (1955)] in 60 cc. of dimethylformamide was added. The reaction mixture was agitated first for 1 hour at 0° C., thereafter for 2 hours at room temperature. Next, the mixture was poured into water and vacuum filtered. The product was washed successively with hot water, then with iced acetone and dried under vacuum. 15 gm. of raw product were isolated.

After successive recrystallizations first from methylethylketone, then from methanol, N-(N′,N′-dimethyldithiocarbamyl)-glutarimide (I, Z=—$CH_2$—$CH_2$—$CH_2$—, $R_1$=$R_2$=$CH_3$) was obtained, having a melting point of 188 to 189° C.

The product occurred in the form of colorless prisms, insoluble in water, slightly soluble in alcohol, acetone, ether and benzene and soluble in chloroform.

*Analysis.* — $C_8H_{12}N_2O_2S_2$; molecular weight=232.3. Calculated: C, 41.36%; H, 5.2%; N, 12.06%; S, 27.61%. Found: C, 41.5%; H, 5.3%; N, 11.9%; S, 27.4%.

By working in the same manner, the following novel compounds were obtained:

(1) N-(N′,N′-dimethyl - dithiocarbamyl) - adipimide (I, Z=—$(CH_2)_4$—, $R_1$=$R_2$=$CH_3$), having a melting point of 197° C.

(2) N - (N′,N′-dimethyl - dithiocarbamyl) - 3,6-endomethylene-hexahydrophthalimide

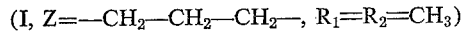

(I, Z = <image structure>, $R_1$=$R_2$=$CH_3$)

having a melting point of 258 to 259° C.

(3) N-(N′,N′-dimethylene - dithiocarbamyl)-phthalimide

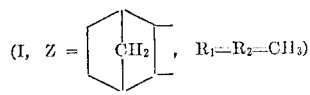

having a melting point of 230 to 231° C.

(4) N - (N′,N′-dimethyl-dithiocarbamyl) - 2,3-dichlorosuccinimide (I, Z=—$(CHCl)_2$—, $R_1$=$R_2$=$CH_3$), having a melting point of 275° C.

EXAMPLE XI

Study of anti-fungal properties of the Compounds II, III, IV and V (1) *Method of spore germination (MacCallan Test).*— The compound to be studied, or the standard compound, was incorporated at different doses in 1 cc. of sterile water, to which was added 1 cc. of a suspension of spores of *Alternaria oleracea*, adjusted to a concentration of 100,000 spores/cc. After 24 hours of contact, it was possible to note the number of germinated spores and that of inhibited spores.

TABLE 1

| Active Material, p.p.m. | *Alternaria oleracea*, Percent Germination | | | | |
|---|---|---|---|---|---|
| | 5 | 10 | 20 | 30 | 40 |
| Compound: | | | | | |
| II | 44 | 9 | 0 | | |
| III | 44 | 19 | 3 | 0 | |
| IV | 21 | 3 | 0 | | |
| V | 76 | 34 | 19 | 2 | 0 |

Control 76% germinated.

A very good inhibition of the germination of the spores was observed.

(2) *Method of incorporation in liquid nutritive media.*—To 4 cc. of nutritive media containing oat extract, first 0.5 cc. of a suspension of spores containing 250,000 units/cc., then 0.5 cc. of an aqueous suspension of active product (at varied concentrations) was added. After a period of agitation, the test tubes were slanted and stored for 6 days at a temperature of 20° C.

The test was made by the observation of the mycelian development on the liquid surface in comparison with an untreated control. The maximum development notes was 5; the total inhibition was equivalent to zero.

TABLE 2

| Active Material, p.p.m. | *Botrytis cinerea* | | | | | | |
|---|---|---|---|---|---|---|---|
| | 100 | 80 | 40 | 20 | 10 | 6 | 2 |
| Compound: | | | | | | | |
| II | | | 0 | 1 | 1 | 1 | 1 |
| III | | 0 | 1 | 1 | 1 | 2 | 2 |
| IV | | | | 0 | 1 | 1 | 1 |
| V | | | | | | 0 | 1 | 3 |

It was ascertained that the inhibiting effect, brought about by the test compounds, was very distinct.

(3) *Fungistatic test in a media enriched in cellulose.*— A 0.5 cc. suspension of active compound (at varied concentrations) and a 0.5 cc. suspension of *Aspergillus flavus* spores, containing 50,000 units/cc., were admixed with 4 cc. of a liquid media containing wood pulp. After 48 hours it was possible to compare the limpidity of the treated tubes in regard to the untreated and uninfested control and in regard to the untreated and infested control to determine the threshold of fungistatic efficacy.

TABLE 3

| Active Material, p.p.m. | *Aspergillus flavus* (Fungistatic Threshold) | | | | | |
|---|---|---|---|---|---|---|
| | 0.1 | 1 | 2 | 10 | 20 | 50 |
| Compound: | | | | | | |
| II | 5 | 4 | | 2 | | 0 |
| III | 5 | 5 | 0 | | | |

(4) *Test in media without carbon and addition of paper discs.*—Three paper discs per Petri dish were impregnated with the active compound by means of an acetonic solution. The concentrations were expressed in μg./gm. of paper. These discs were deposited under sterile conditions on a nutritive agar medium free of carbon. Spores of cellulolytic fungi (*Penicillium luteum* or *Trichoderma lignorum*) were then sprinkled over the surface of the nutritive media. Preferably, they expanded if the disc was not sufficiently protected at the expense of the carbon furnished by the cellulose.

TABLE 4

| | Number of discs acted upon | | | | | | |
|---|---|---|---|---|---|---|---|
| Control: | Intensity of attack Number of discs attacked=9 out of 9 | | | | | | |
| | Intensity of attack=3.6 to 4 out of 4 | | | | | | |
| Weights in μg./gm. of paper | 4.68 | 9.37 | 18.75 | 37.5 | 75 | 150 | 300 |
| *Trichoderma lignorum:* | | | | | | | |
| Compound II | 9 | 9 | 9 | 9 | 7 | 0 | |
| | 4 | 4 | 4 | 3.6 | 3 | 0 | |
| Compound III | 9 | 9 | 9 | 8 | 6 | 1 | 0 |
| | 4 | 4 | 3.6 | 3.3 | 2.3 | 0.3 | 0 |
| *Penicillium luteum:* | | | | | | | |
| Compound II | 9 | 9 | 9 | 4 | 0 | | |
| | 4 | 3.6 | 0.6 | 0 | | | |
| Compound III | 9 | 7 | 1 | 2 | 0 | | |
| | 3.3 | 3.6 | 1.3 | 2.3 | 0 | | |

In these two tests the compounds exhibited a good efficacy.

(5) Test on living plants.

(a) On tomato leaves infested with *Phytophthora infestans*.—Leaves from tomato plants were placed in Petri dishes, the base of which was covered with a Chardin paper disc. Each surface of the dishes received 0.5 cc. of a suspension of active compound with different concentrations.

After drying, the inoculation was carried out dropwise at the rate of 4 drops of the *Phytophthora infectans* suspension containing 100,000 units/cc. for each leaf.

The test was concluded 5 days later and the results express the percentage of contaminated spots.

TABLE 5

| Percent of Contaminated Spots in regard to Controls | | |
| --- | --- | --- |
| Compound | Concentration | |
| II | 0.01% | 100% |
| | 0.05% | 0% |
| | 0.1% | 0% |
| III | 0.01% | 100% |
| | 0.05% | 30% |
| | 0.1% | 15% |

(b) On vine leaves infested with *Plasmopara viticola*.— A circle of plexiglass, with a diameter of 95 mm. and having a perforation of 8 mm., covered the entire vine leaf placed in the Petri dish. A series of 4 doses of products to be tested was prepared.

The density of the pulverization was 0.5 cc. for the 72 cm.² surface under the plate. For each dispersion, only that portion of the leaf, which was under the perforation of the disc, was treated with the toxic product. By rotating the disc, 4 areas were obtained, on which the product had been dispersed at different concentrations.

After the preparation had dried (requiring about 24 hours) a contamination of the entire leaf by *Plasmopara viticola* was realized by sprinkling the leaf with freshly gathered conidium in twice distilled water.

TABLE 6

| Control Leaves Without Treatment: +++ | | | | |
| --- | --- | --- | --- | --- |
| | 0.1% | 0.05% | 0.025% | 0.0125% |
| Compound II | 0 | + | ++ | +++ |
| Compound III | 0 | 0 | + | ++ |

(6) Test on wheat seeds contaminated with diverse cryptogams.—A batch of wheat seeds, chiefly parasitized with septoria and penicillin, was treated by dusting at the rate of 200 g. PC/Q. All of the treatments were made with a powder having 50% of active material (PC/Q=composite powder per hundred weight).

The batch of grains was obtained from the 1963 crop and, under the conditions of storage to which this lot had been submitted, the natural development of secondary parasites of the penicillin type had to be feared.

For each treated lot, 10 grains were placed in each dish, and there was two repetitions of 10 dishes each for each treatment. The number of colonies which developed, as well as the nature of these colonies was noted.

ried out by means of a suspension of *Fusarium roseum* spores containing 10⁶ spores/cc. The grains were steeped in this suspension for 30 minutes. After this lapse of time, the seeds were dried for 24 hours at a temperature of 20° C. The treatments were effected at a rate of 200 gm. of active product/hundred weight, preceded by a humidification of the grains at the rate of 200 cc./hundred weight.

After completed seeding, the development of the young plants was examined, and the percentage was determined of the healthy plants, as well as of the plants diseased and killed by the action of the parasite.

TABLE 8.—TREATMENT OF SEEDS AFTER ARTIFICIAL CONTAMINATION BY *FUSARIUM ROSEUM*

| Active Product | Percentage of Plants | | |
| --- | --- | --- | --- |
| | Healthy | Diseased | Dead |
| Compound: | | | |
| II | 48.4 | 38 | 13.6 |
| III | 57 | 28.4 | 14.6 |
| IV | 62.8 | 24.8 | 12.4 |
| V | 65.4 | 24 | 10.6 |
| Contaminated Control | 19.2 | 31.8 | 49 |
| Not contaminated Control (steeped) | 88.6 | 11.2 | 2 |
| Control not contaminated and unsteeped | 77.6 | 19.4 | 3 |

Study of the phytotoxicity of the compounds.—The study of the phytotoxicity was carried out on cotyledonary leaves of beans according to the following formula:

Dwarf beans (variety "Fin de Monclar") were cultivated in pots at constant temperature (20±2° C.) under artificial light from 8 o'clock to 22½ o'clock. 4 pots each containing 3 or 4 beans were used for each concentration of product to be tested. At the stage of the development of two primordial leaves (2nd inter-node measuring about 1 cm.), one proceeded by immersing the left primordial leaf in the solution to be tested. After this treatment, the pots were returned to the original place, and the plants were observed after 2 and 6 days. The values of phytotoxicity were indicated according to the criteria of poignant, with the following scale:

0—no change in the leaves.
0.5—traces or difference in color with the controls.
1—some plasmolytic areas distributed over the limb.
2—beginning or withering.
3—revealed drying in the marginal area of the limb.
4—pronounced drying and crimping of the limb.
5—the entire leaf shriveled up—surface became very reduced.

The indicated value expressed the average of the notations made for each leaf.

The compounds were tested in aqueous dispersion at three doses: 200, 400 and 800 gm. of active material per hectoliter of water.

This study demonstrates the complete innocuousness of the investigated compounds even at the very high concentration of 800 gm. per hl. This absence of phytotoxicity permits, consequently, without any disadvantage, the utilization of the compounds, by sprinkling the same on the foilage to protect the latter against fungal infections.

The preceding specific embodiments are illustrative of

TABLE 7

| Compound | Number of Colonies Per 100 Grains | | | | | | |
| --- | --- | --- | --- | --- | --- | --- | --- |
| | Penicillium sp. | Septoria sp. | Fusarium sp. | Alternaria sp. | Trichoderma sp. | Epicocum sp. | Total Colonies |
| II | 1-5 | 3-6 | 0-2 | 0-0 | 0-0 | 0-0 | 4-13 |
| III | 0-16 | 13-17 | 0-3 | 0-0 | 0-0 | 0-0 | 13-36 |
| Control | 67-92 | 28-30 | 1-2 | 3-6 | 1-1 | 0-1 | 100-132 |

The activity of the compounds was apparent on all of the parasites present.

(7) Test for anti-fungal action on contaminated grains.—The contamination of Champlein wheat was carthe present invention. It is to be understood, however, that other expedients may be employed without departing from the spirit of the invention or the scope of the appended claims.

We claim:
1. An N-(N',N'-substituted-dithiocarbamyl)-imide of the formula

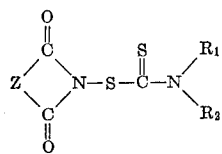

wherein Z is a bivalent organic radical selected from the group consisting of

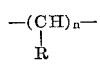

wherein R represents a member selected from the group consisting of hydrogen, lower alkyl, and halogen and $n$ is an integer from 1 to 4,

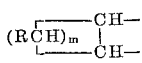

wherein R has the above-assigned values and $m$ is an integer from 2 to 6,

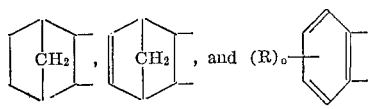

wherein R represents a member selected from the group consisting of hydrogen, lower alkyl, nitro and halogen and $o$ is an integer from 1 to 4; and $R_1$ and $R_2$ are members selected from the group consisting of lower alkyl, lower alkenyl, phenyl-lower-alkyl, phenyl, and together with the nitrogen, morpholinyl, pyrrolidinyl and ethyleniminyl.

2. The compound of claim 1 wherein Z is —(CH$_2$)$_2$— and $R_1$ and $R_2$ are methyl.

3. The compound of claim 1 wherein Z is

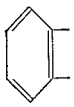

and $R_1$ and $R_2$ are methyl.

4. The compound of claim 1 wherein Z is

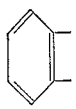

and $R_1$ and $R_2$ together with the nitrogen is morpholinyl.

5. The compound of claim 1 wherein Z is

and $R_1$ and $R_2$ are methyl.

6. The compound of claim 1 wherein Z is

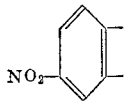

and $R_1$ and $R_2$ are methyl.

7. The compound of claim 1 wherein Z is

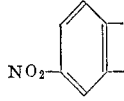

and $R_1$ and $R_2$ together with the nitrogen is pyrrolidinyl.

8. The compound of claim 1 wherein Z is

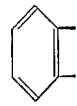

and $R_1$ and $R_2$ are ethyl.

9. The compound of claim 1 wherein Z is

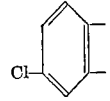

and $R_1$ and $R_2$ are methyl.

10. The compound of claim 1 wherein Z is

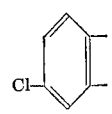

and $R_1$ and $R_2$ together with the nitrogen is pyrrolidinyl.

11. The compound of claim 1 wherein Z is —(CH$_2$)$_3$— and $R_1$ and $R_2$ are methyl.

12. The compound of claim 1 wherein Z is —(CH$_2$)$_4$— and $R_1$ and $R_2$ are methyl.

13. The compound of claim 1 wherein Z is

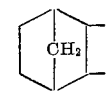

and $R_1$ and $R_2$ are methyl.

14. The compound of claim 1 wherein Z is

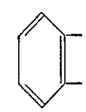

and $R_1$ and $R_2$ together with the nitrogen is ethyleniminyl.

15. The compound of claim 1 wherein Z is —(CHCl)$_2$— and $R_1$ and $R_2$ are methyl.

16. The process of producing the compound of claim 1 which comprises the steps of reacting a dithiocarbamic acid salt of the formula

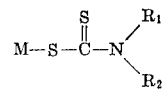

wherein M represents an alkali metal and $R_1$ and $R_2$ are members selected from the group consisting of lower alkyl, lower alkenyl, phenyl-lower-alkyl, phenyl, and together with the nitrogen, morpholinyl, pyrrolidinyl and ethyleniminyl, in an organic solvent, with an N-haloimide of the formula

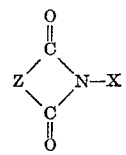

wherein X represents a halogen selected from the group consisting of chlorine and bromine and Z is a bivalent organic radical selected from the group consisting of

wherein R represents a member selected from the group consisting of hydrogen, lower alkyl, and halogen and $n$ is an integer from 1 to 4,

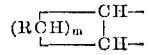

wherein R has the above-assigned values and $m$ is an integer from 2 to 6,

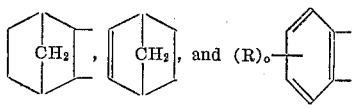

wherein R represents a member selected from the group consisting of hydrogen, lower alkyl, nitro and halogen and $o$ is an integer from 1 to 4; and recovering said compound of claim 1.

17. An N-(N',N'-substituted-dithiocarbamyl)imide of the formula

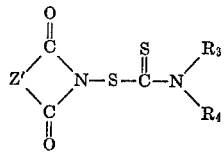

wherein Z' is a bivalent organic radical selected from the group consisting of

wherein R' represents a member selected from the group consisting of hydrogen and chloro and $n$ is an integer from 2 to 4

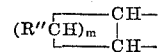

wherein R" represents a member selected from the group consisting of hydrogen, chloro and methoxy and $m$ is 4,

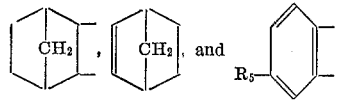

wherein $R_5$ represents a member selected from the group consisting of hydrogen, chloro, nitro and methyl; and $R_3$ and $R_4$ are members selected from the group consisting of lower alkyl, and, together with the nitrogen, morpholinyl, pyrrolidinyl and ethyleniminyl.

References Cited

UNITED STATES PATENTS 3,371,085  2/1968  Reeder et al. _____ 260—239.3

HENRY R. JILES, *Primary Examiner.*

R. T. BOND, *Assistant Examiner.*

UNITED STATES PATENT OFFICE
CERTIFICATE OF CORRECTION

Patent No. 3,410,842 November 12, 1968

André Allais et al.

It is certified that error appears in the above identified patent and that said Letters Patent are hereby corrected as shown below:

Column 3, line 40, "infestaations" should read -- infestation --. Column 5, line 6, "(R=Cl, n=2)" should read -- (R=CH$_3$, n=2) --; lines 26 to 33 should appear as shown below:

(d) 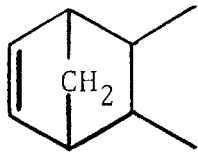

for example, 3-6-endomethylene-1,2-tetrahydrophenylene; and

Column 6, line 30, after "reaction" insert -- mixture --.

Signed and sealed this 21st day of April 1970.

(SEAL)
Attest:

EDWARD M. FLETCHER, JR.
Attesting Officer

WILLIAM E. SCHUYLER, JR.
Commissioner of Patents